United States Patent
Kuchi et al.

(10) Patent No.: US 12,550,131 B2
(45) Date of Patent: Feb. 10, 2026

(54) METHOD AND SYSTEM FOR SCHEDULING A POOL OF RESOURCES TO A PLURALITY OF USER EQUIPMENTS

(71) Applicants: INDIAN INSTITUTE OF TECHNOLOGY HYDERABAD, Sangareddy (IN); WISIG NETWORKS PRIVATE LIMITED, Hyderabad (IN)

(72) Inventors: Kiran Kumar Kuchi, Hyderabad (IN); Saidhiraj Amuru, Hyderabad (IN); Harish Kumar Dureppagari, Hyderabad (IN); Pavan Kumar Reddy Manne, Hyderabad (IN)

(73) Assignees: Indian Institute of Technology Hyderabad (IN); Wisig Networks Private Limited (IN)

( * ) Notice: Subject to any disclaimer, the term of this patent is extended or adjusted under 35 U.S.C. 154(b) by 678 days.

(21) Appl. No.: 17/264,067

(22) PCT Filed: Aug. 8, 2019

(86) PCT No.: PCT/IN2019/050585
§ 371 (c)(1),
(2) Date: Jan. 28, 2021

(87) PCT Pub. No.: WO2020/031210
PCT Pub. Date: Feb. 13, 2020

(65) Prior Publication Data
US 2021/0321423 A1    Oct. 14, 2021

(30) Foreign Application Priority Data
Aug. 8, 2018    (IN) .............................. 201841029885

(51) Int. Cl.
*H04W 72/121* (2023.01)
*H04B 7/0452* (2017.01)
(Continued)

(52) U.S. Cl.
CPC ........ *H04W 72/121* (2013.01); *H04B 7/0452* (2013.01); *H04B 7/0456* (2013.01);
(Continued)

(58) Field of Classification Search
CPC .. H04W 72/121; H04W 72/51; H04B 7/0452; H04B 7/0456; H04B 7/0626; H04B 7/0632; H04B 7/0617; H04B 7/0689
(Continued)

(56) References Cited

U.S. PATENT DOCUMENTS

| 2008/0232492 A1* | 9/2008 | Xiao | H04L 1/0026 375/260 |
| 2009/0175233 A1* | 7/2009 | Ojala | H04L 1/1861 370/329 |

(Continued)

OTHER PUBLICATIONS

International Search Report and Written Opinion corresponding to International Patent Application No. PCT/IN2019/050585, mailed Nov. 21, 2019.

(Continued)

*Primary Examiner* — Thuong Nguyen
(74) *Attorney, Agent, or Firm* — McAndrews, Held & Malloy, Ltd.

(57) ABSTRACT

Embodiments of the present disclosure relates to a method and system to schedule a pool of resources to a plurality of user equipment's (UEs). The method comprises grouping the UEs using inputs from UEs, to obtain a plurality of groups. Also, method comprises determining a pivot UE from the UEs using a first metric associated with each of the UEs, associated with a selected group from the plurality of (Continued)

groups. Further, the method comprises pairing the pivot UE with at least one UE using a second metric, wherein the at least one UE is associated with the selected group. Next, precoding weights are determined for each of the plurality of UE's associated with the selected group. Thereafter, transmitting data and reference signals associated with each UE associated with the selected group, using the corresponding precoding weights on a sub-set of pool of resources.

18 Claims, 6 Drawing Sheets

(51) Int. Cl.
    *H04B 7/0456*     (2017.01)
    *H04B 7/06*     (2006.01)
    *H04W 72/51*     (2023.01)

(52) U.S. Cl.
    CPC ......... *H04B 7/0626* (2013.01); *H04B 7/0632* (2013.01); *H04W 72/51* (2023.01)

(58) Field of Classification Search
    USPC .......................................................... 370/329
    See application file for complete search history.

(56) References Cited

U.S. PATENT DOCUMENTS

| | | | |
|---|---|---|---|
| 2010/0246715 A1* | 9/2010 | Dao | H04J 11/0033 375/296 |
| 2010/0278109 A1* | 11/2010 | Papasakellariou | H04L 5/0037 370/328 |
| 2012/0195264 A1* | 8/2012 | Taoka | H04B 7/0652 455/562.1 |
| 2012/0320839 A1* | 12/2012 | Noh | H04L 1/1861 370/329 |
| 2013/0028215 A1* | 1/2013 | Gerlach | H04L 25/03343 370/329 |
| 2013/0070871 A1* | 3/2013 | To | H04B 7/0626 375/296 |
| 2013/0195047 A1* | 8/2013 | Koivisto | H04L 1/1614 370/329 |
| 2014/0269364 A1* | 9/2014 | Knapp | H04L 41/083 370/252 |
| 2015/0195019 A1* | 7/2015 | Nagata | H04W 52/322 375/267 |
| 2015/0200718 A1* | 7/2015 | Sajadieh | H04W 28/02 375/267 |
| 2015/0244418 A1* | 8/2015 | Verbin | H04B 7/0686 370/201 |
| 2016/0037550 A1* | 2/2016 | Barabell | H04W 72/1263 455/450 |
| 2016/0212757 A1* | 7/2016 | Jung | H04W 72/51 |
| 2019/0068269 A1* | 2/2019 | He | H04B 7/0452 |
| 2019/0150011 A1* | 5/2019 | Shoji | H04W 76/27 370/329 |
| 2021/0014872 A1* | 1/2021 | Sankaran | G06N 20/00 |
| 2021/0321423 A1* | 10/2021 | Kuchi | H04W 72/51 |
| 2021/0345261 A1* | 11/2021 | Baldemair | H04L 5/14 |

OTHER PUBLICATIONS

Fodor, Gabor et al., An Overview of Massive MIMO Technology Components in METIS. IEEE Communications Magazine. 55. 155-161. Jan. 31, 2017.

* cited by examiner

METHOD AND SYSTEM FOR SCHEDULING A POOL OF RESOURCES TO A PLURALITY OF USER EQUIPMENTS

CROSS-REFERENCE TO RELATED APPLICATIONS

This application claims priority from Indian Provisional Patent Application Number 201841029885, filed on Aug. 8, 2018, the entirety of which are hereby incorporated by reference.

The present application is a national stage application under 35 U.S.C. § 371 of application Serial No. PCT/IN2019/050585, filed on Aug. 8, 2019, and entitled "METHOD AND SYSTEM FOR SCHEDULING A POOL OF RESOURCES TO A PLURALITY OF USER EQUIPMENT'S." The aforementioned application is hereby incorporated herein by reference in its entirety.

TECHNICAL FIELD

Embodiments of the present disclosure are related, in general to communication, but exclusively relate to a method and system of scheduling a pool of resources to a plurality of user equipment's.

BACKGROUND

Currently, communication systems have large number of antennas supporting a variety of transmission modes that can be used to satisfy the huge data requirements of the user equipment's (UEs). To achieve this, there is need of multi-user multiple-input and multiple-output (MU-MIMO) technology to be used efficiently. The modern-day cellular systems deal with various types of UEs requesting different types of data. For this, a scheduler is required to handle all the UEs and to satisfy all the various requirements. Thus, a base station (BS) using a scheduler prioritizes all the UEs as per their requirements and thereafter schedules them. The scheduler of the BS makes sure that all the UE requirements are met, and no UE is starved. Generally, the UEs often operate in transmission mode (TM) 3, or TM4 to serve UE via single user multiple-input and multiple-output (SU-MIMO). With the advance in technology, there are more UEs which requires support of other TMs, such as TM7 and TM8. Also, there is a demand for large number of antennas requiring TM9 supported UEs, for more flexibility in MU-MIMO UE pairing.

Figure 1:
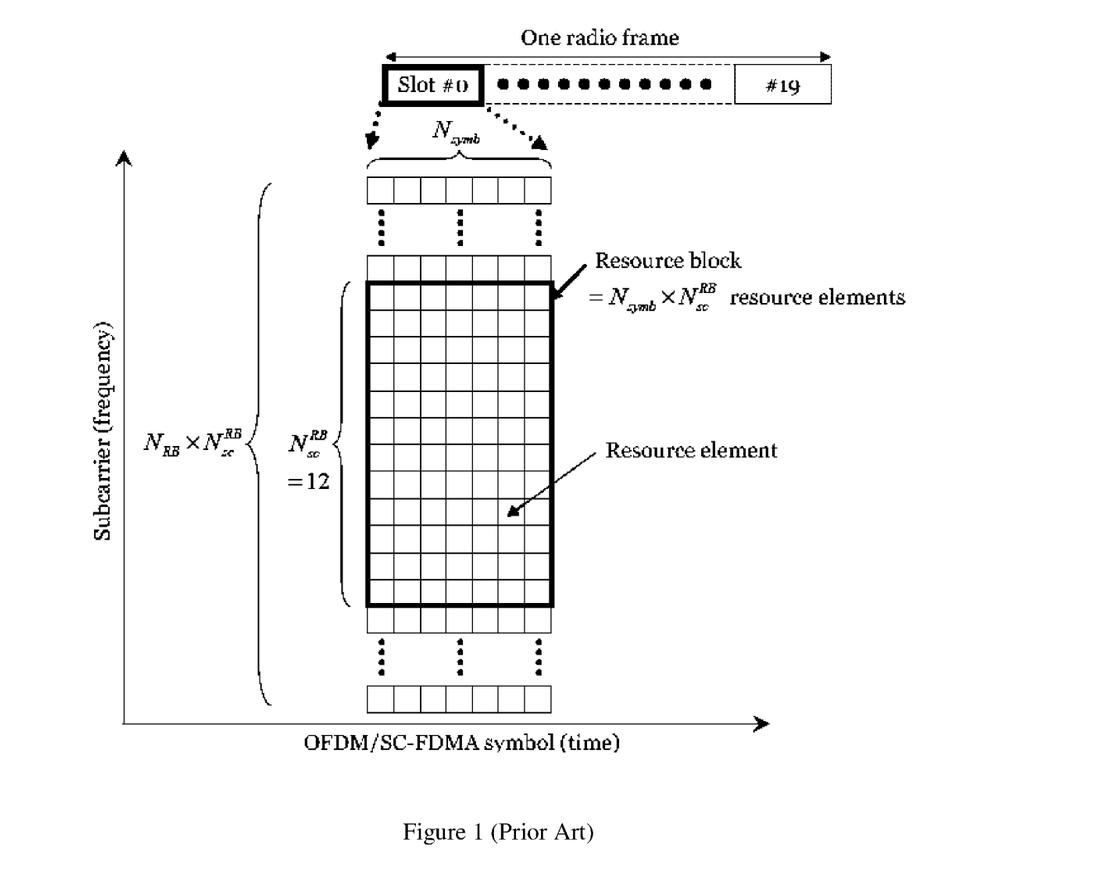
FIG. 1 shows an illustration of a resource grid in a communication system.

FIG. 1 shows an illustration of a resource grid in a communication system. This resource grid is for long term evolution (LTE) to schedule resources in both time and frequency. As shown in FIG. 1, considering one radio frame is of 10 ms consisting of 10 subframes each of 1 ms. Each subframe is of 2 slots and each slot is of 0.5 ms. There would be 7 OFDM/SCFDM symbols in a slot. So, there would be 14 symbols in a subframe and totally 140 symbols in a frame. One Physical Resource Block (PRB) is of 0.5 ms in time and 12 subcarriers in each symbol. Smallest unit in a resource grid is called as resource element. A PRB comprises of 84 resource elements. Resource allocation for the scheduled users or UEs is performed based on the corresponding proportional fair metric in terms of PRBs. With the advance in technology, there are more UEs which requires support of other TMs and resources. There is a need to improve the resource allocation by the base station to the UEs.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In an aspect of the present disclosure, a method of scheduling a pool of resources to a plurality of user equipment's (UEs) is provided. The method comprises grouping, by a communication system, the plurality of UEs using a plurality of inputs to obtain a plurality of groups, said plurality of inputs are received from the plurality of UEs. Also, method comprises determining a pivot UE from the plurality of UEs using a first metric associated with each of the plurality of UE's. The plurality of UEs are associated with a selected group from the plurality of groups. Further, the method comprises pairing the pivot UE with at least one UE using a second metric, wherein the at least one UE associated with the selected group. Furthermore, the method comprises determining precoding weights for each of the plurality of UE's associated with the selected group and transmitting data and reference signals associated with each of the plurality of UE's associated with the selected group, using the corresponding precoding weights on a sub-set of pool of resources. The sub-set of resources are allocated to a sub-set of plurality of groups based on the first metric.

Another aspect of the present disclosure is a method of performing user equipment (UE) pairing by a communication system. The method comprising determining a pivot UE from a plurality of UEs using a first metric associated with each of the plurality of UE's. Also, method comprises ordering the plurality of UEs based on the first metric and generating a second metric by measuring CSI separability between any two UEs from the plurality of UEs. Further, the method comprises pairing a sub-set of ordered plurality of UEs with the pivot UE using the second metric.

Another aspect of the present disclosure is a method of generating a measure of channel state information (CSI) separability in a communication system. The method comprising obtaining CSI associated with a pool of resources from a plurality of UEs. Also, the method comprises determining metrics for any pair of UEs from the plurality of UEs using a sub-set of obtained CSI associated with a pool of resources from the plurality of UEs and generating the measure of CSI separability by performing a predefined operation on the metrics.

Another aspect of the present disclosure is a communication system to schedule a pool of resources for a plurality of user equipment's (UEs). The communication system comprises a grouping unit, a pairing unit, a precoder and a plurality of transmitters. The grouping unit groups the plurality of UEs using a plurality of inputs to obtain a plurality of groups. The plurality of inputs is received from the plurality of UEs. The pairing unit determines a pivot UE from the plurality of UEs using a first metric associated with each of the plurality of UE's. The plurality of UEs are associated with a selected group from the plurality of groups and pair the pivot UE with at least one UE using a second metric, wherein the at least one UE associated with the selected group. The precoder determines precoding weights for each of the plurality of UE's associated with the selected group. The plurality of transmitters transmit data and reference signals associated with each of the plurality of UE's associated with the selected group, using the corresponding precoding weights on a sub-set of pool of resources. The sub-set of resources are allocated to a sub-set of plurality of groups based on the first metric.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Embodiments of the present disclosure relates to a scheduler, which is configured to perform switching between single user multiple-input and multiple-output (SU-MIMO)/multi-user multiple-input and multiple-output (MU-MIMO) for transmission mode (TM) 3/4/7 supported user equipment's (UEs). The TM 3/4 support only SU-MIMO as per 3rd Generation Partnership Project (3GPP) standard. The TM7 supports single port 5 transmission using one port DMRS. TM8 is a dual layer beamforming using 2 port DMRS and reuse factor of 2 using different scrambling IDs. TM9 supports up to 8-layer transmission using up to 8 ports, reuse factor of 2 is supported for 4 port transmission.

Figure 2:
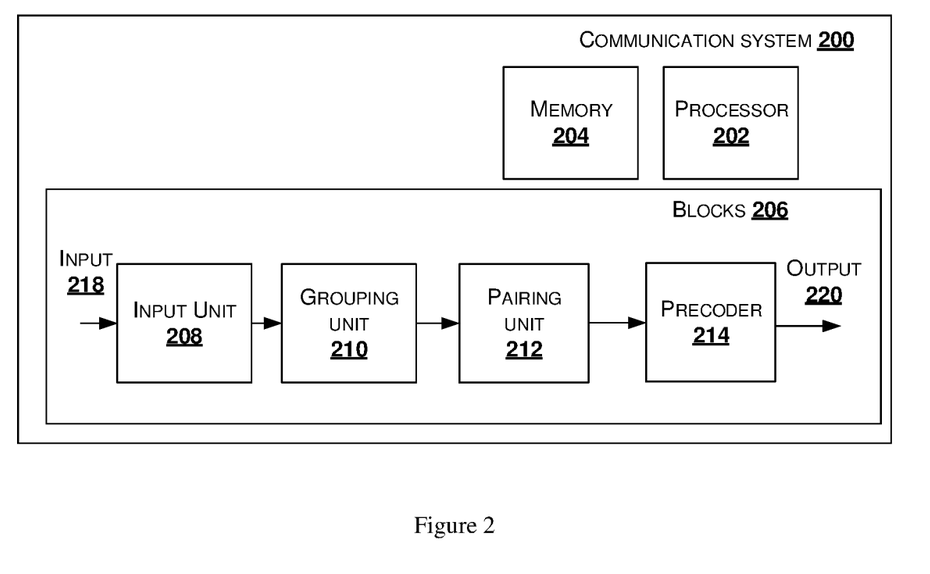
FIG. 2 shows a block diagram of a communication system for scheduling pool of resources to a plurality of user equipment's (UEs), in accordance with some embodiments of the present disclosure.

FIG. 2 shows a block diagram of a communication system for scheduling pool of resources to a plurality of user equipment's (UEs), in accordance with some embodiments of the present disclosure.

As shown in FIG. 2, the communication system 200, also referred as a base station (BS) or a system, comprises a processor 202, a memory 204. Also, the BS 200 comprises a plurality of antennas (not shown in the Figure), for transmitting and receiving data or information. The memory 204 may be communicatively coupled to the processor 202. The processor 202 may be configured to perform one or more functions of the BS 200 such as, but not limited to transmitting and receiving signals, and scheduling pool of resources to a plurality of UEs. The UEs are also referred as users. In one implementation, the BS 200 may comprise blocks 206, also referred as units or modules, for performing various operations in accordance with the embodiments of the present disclosure.

The blocks 206 include an input unit 208, a grouping unit 210, a pairing unit 212, a precoder 214, a plurality of antennas and other blocks (not shown in the Figure). The grouping unit 210, the pairing unit 212, and the precoder 214 are together referred as a scheduler.

The input unit 208, configured in the BS 200, receives a plurality of inputs 218, or referred as inputs. The input 218 is received from a plurality of user equipment's, which are at least one of sounding reference signals (SRS), channel state information (CSI), channel quality indicator (CQI), buffer occupancy, type of traffic, and the like.

Figure 3:
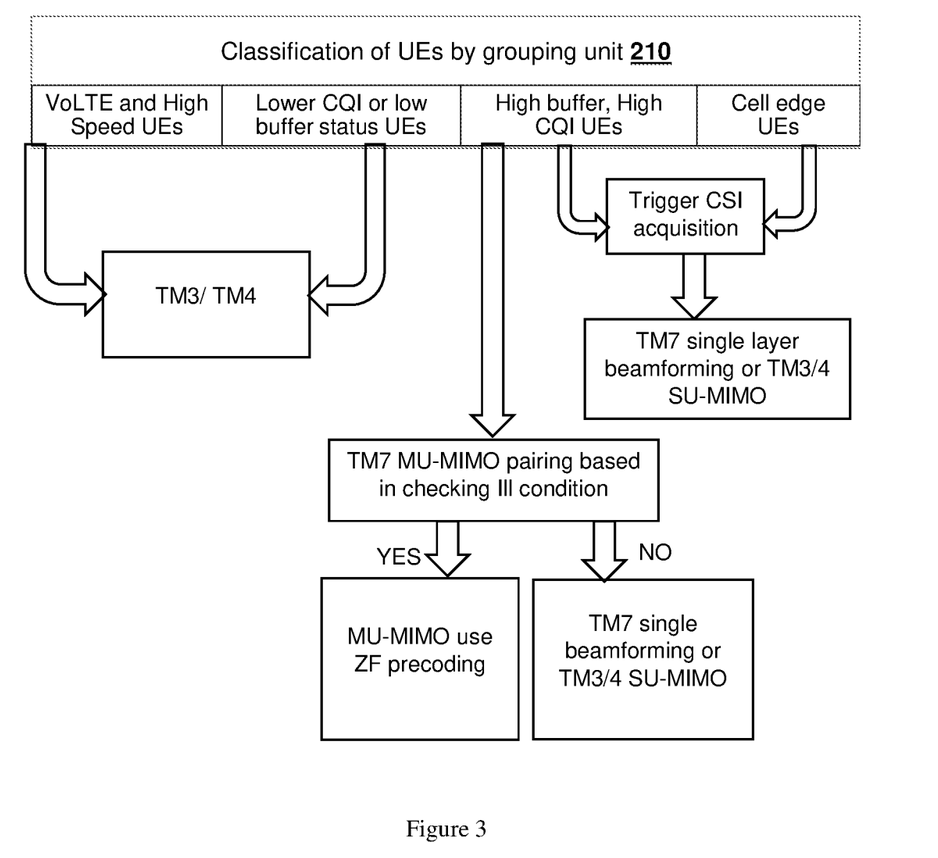
FIG. 3 shows an illustration of grouping a plurality of UEs by the communication system, in accordance with an embodiment of the present disclosure.

The grouping unit 210, configured in the BS 200, performs grouping or classification of the plurality of UEs using corresponding input signals 218, to obtain a plurality of groups. The grouping unit 210 is also referred as a classifier or classification unit. The grouping unit 210 classifies the UEs using CQI metric obtained for each UE from the inputs 218. The UE classification is based on certain characteristic such as, but not limited to voice over long term evolution (VoLTE) and High Speed UEs, low channel quality indicator (CQI), low buffer user, single user multiple input multiple output (SU-MIMO) eligible user, multi user multiple input multiple output (MU-MIMO) eligible user, high buffer user, high CQI user, cell edge user, voice over long term evolution (LTE) user and the like. The classification or grouping of UEs produces a plurality of groups such as, but not limited to VoLTE and High Speed UEs group, low CQI or low buffer UE group, high buffer or high CQI group and cell edge UE group is as shown in FIG. 3. FIG. 3 shows an illustration of grouping or classification of a plurality of UEs by the communication system, in accordance with an embodiment of the present disclosure.

As shown in FIG. 3, the grouping unit 210, configured in the BS 200, facilitates the UEs of VoLTE and high speed UE group using transmission mode (TM) 3/4 of transmission i.e. as single user SU-MIMO UEs. The grouping unit 210 provides all the other UEs, which are not in the VoLTE and high speed UE group, with TM 3/4 i.e. SU-MIMO until a stable CQI is received from the other UEs. The BS 200 performs a periodic CQI monitoring for these other UEs. Also, a channel state information (CSI) acquisition is triggered by the grouping unit for higher buffer, higher CQI UEs and low speed cell edge users, which are served using TM 7 single layer beamforming.

In an embodiment, the grouping unit 210 is configured to monitor CQI and if the CQI degrades for any UE triggered with CSI acquisition, then the UE is provided with the TM3/4 SU-MIMO. The lower CQI and low buffer UEs operate in TM3/4 SU-MIMO. In SU-MIMO, TM4 is always preferred transmission mode, TM3 is preferably for high speed UEs. Other transmission modes such as TM1, TM2 may also be used as deemed appropriate. For each UE scheduled as TM4 UE, the grouping unit 110 relies on CSI reports which include Precoding Matrix Indicator (PMI), rank indicator (RI) and CQI. For TM3, the scheduled UEs rely on CQI and RI.

In an embodiment, the BS 200 tracks overall load i.e. the total number of UEs to be served. If the load is well within the system capacity, it can only serve users via transmission modes such as TM3/4 i.e., SU-MIMO modes. However, if the load increase beyond the system capacity, the BS 100 activates MU-MIMO modes by using user pairing.

After scheduling the SPS (VOLTE) users, and other high priority users such as public safety users, the following is used for scheduling the other users such as TM7 MU-MIMO or Single Layer Beamforming, and TM3/4 SU-MIMO. In an embodiment, a proportional fair scheduling (PFS) metric, also referred as proportional fair (PF) metric, is obtained for scheduling the users, which prioritizes a user or UE based on the ratio of instantaneous rate and average rate. For example, in case of finite buffer and different resource types for a user, PFS takes QCI Priority, CQI Priority, Fairness Priority and PDB Priority into consideration for determining the PF metric.

Referring back to FIG. 2, the pairing unit 212 determines a pivot UE from the plurality of UEs using a first metric associated with each of the plurality of UE's. The plurality of UEs are associated with a selected group from the plurality of groups. The first metric is one of proportional fair (PF) metric, number of scheduling opportunities and the like. The pivot UE is obtained by determining a proportional fair (PF) metric for each of the plurality of UEs and selecting a UE with highest PF metric as a pivot UE.

In one embodiment, the pairing unit 212 performs pairing by determining a pivot UE from a plurality of UEs using a first metric associated with each of the plurality of UE's, ordering the plurality of UEs based on the first metric, generating a second metric for measuring channel state information (CSI) separability between any two UEs from the plurality of UEs, and pairing a sub-set of ordered plurality of UEs with the pivot UE using the second metric.

One embodiment of the present disclosure is a method of generating a measure of channel state information (CSI) separability in the communication system 200. The method comprising obtaining CSI associated with a pool of resources from a plurality of UEs. Also, the method comprises determining metrics for any pair of UEs from the plurality of UEs using a sub-set of obtained CSI associated with a pool of resources from the plurality of UEs and generating the measure of CSI separability by performing a predefined operation on the metrics.

PFS decides which user or UE to be scheduled in a particular Transmission Time Intervals (TTI). The PF metric is calculated using the below equation:

$$PF \text{ metric} = \frac{R_k[m]}{T_k[m]}$$

where k is the UE index and m is TTI
For example, if k is the UE scheduled in TTI m $$T_k[m] = \left(1 - \frac{1}{t_c}\right)T_k[m-1] + \frac{1}{t_c}R_k[m]$$

If k is the unscheduled UE in TTI m $$T_k[m] = \left(1 - \frac{1}{t_c}\right)T_k[m-1]$$

where,
$R_k[m]$ is the instantaneous rate of $k^{th}$ UE at $m^{th}$ TTI,
$T_k[m-1]$ is the average rate of $k^{th}$ UE at $(m-1)^{th}$ TTI,
$T_k[m]$ is the average rate of $k^{th}$ UE at $m^{th}$ TTI, and
$t_c$ is the averaging window period.

Also, the pairing unit 212 is configured to perform user or UE pairing, i.e. pairing the pivot UE with at least one UE using a second metric. The at least one UE is associated with the selected group. The second metric is derived from channel state information (CSI) associated with each UE of the selected group. The pairing unit 212 upon pairing outputs a set of users or UEs or one or more UEs which would be scheduled in same resources from the pool of resources.

In one embodiment of the present disclosure, the pairing unit 212 performs ordering the one or more UEs or UEs or users based on the first metric value, that is the PF metric. The users are ordered based on the priority provided by the PF metric. The users are queued in MU-MIMO bin by arranging in a descending order of the PF metrics to obtain an order list. After arranging the UEs in descending order of PF metric, the pairing unit 212 a pivot user with highest PF metric is picked to start user pairing.

The method of pairing the users using the pairing unit 212 comprises ordering the user in an order list in descending order of the associated PF metric. Also, the method comprises selecting a first user $UE_i$ from the order list and adding the first user $UE_i$ to a pairing list. Further, collecting CSI of all users in pairing list, and computing a list of second metrics between a channel of next user i.e. $UE_j$ from the ordered list, and channel associated with each of the users in the pairing list. Comparing each of the list of second metrics with a threshold and including this user $UE_j$ in the paired list, if every value in list of second metrics satisfies threshold. Repeating the step of computing the list of second metric using channel of all the users in the order list and comparing with the threshold, to obtain a paired list of users.

One embodiment of the present disclosure is computing second metric, in accordance with an embodiment of the present disclosure. The computation of the correlation metric is performed to acquire CSI, uplink (UL)/downlink (DL) channel reciprocity is used, i.e. channel estimated in UL may be used as DL channel after performing radio frequency (RF) calibration. However, channel coefficients estimated in UL may include power control and path loss. To avoid/normalize effect of power control and path loss, the channel estimates are normalized before performing user pairing, such that power levels may be on same scale for all UEs. When two UEs with different power levels are paired, the normalization makes sure the UE with lower power, i.e. higher path loss does not affect the performance of UE with higher power, i.e. lower path loss. The normalization is performed using the below equation:

$$H_i = \frac{\hat{H}_i}{\sqrt{\frac{1}{L}\Sigma_{l=1}^{L}|\hat{H}_{i,l}|^2}}$$

wherein channel $\hat{H}_i$ is estimated for UL and has L channel coefficients. L is number of Transmit antennas at Base station 100. The normalization may be part of CSI acquisition, i.e.

$$Corr(H_i,H_j)=|H_i^\dagger H_j|$$

The BS 200 performs user pairing by updating sub-band CSI using CSI acquisition, followed by wideband CSI over time. Also, the BS 200 creates a paired list $S_{Prec}$ and adding a pivot user into the paired list.

In one embodiment, the pairing unit 212 uses a wideband CSI, which is one channel estimate obtained by using updated sub-band CSI over full band. That is, the CSI acquisition uses about 100 channel estimates (for 100 physical resource blocks (PRBs)) to get 1 wideband estimate. Considering, the wideband estimates of all users in MU-MIMO eligible users are formed as one matrix with transmit antennas as number of rows and number of users in MU-MIMO eligible users, as number of columns. The BS 200 performs user pairing using the pairing unit 212 by computing the correlation metric $R=H^\dagger H$. Here, the user pairing uses metric R to do successive addition of users to pairing list $S_{Prec}$ based on the order of users in the list.

In another embodiment, the pairing unit 212, configured in the BS 200, performs pairing based on decimated correlation metric. The BS 200 collects a plurality of channel coefficients or CSI metrics in the band of interest and computes correlation using those channel coefficients. The BS 100 takes average or least value among the computed correlation values and provides it as an input to the pairing unit 212. For example, the BS 200 takes 1 CSI estimate for 10 PRBs and computes correlation values. User pairing uses this metric to do successive addition of users to pairing list $S_{Prec}$ based on the order of users in the ordered list.

In another embodiment, the BS 200 computes correlation using all CSI estimates corresponds to band of interest and takes average or least value among all the values to obtain a metric. The average or least value is provided as an input to the pairing unit 212. That is, the correlation is computed using a maximum of 100 estimates corresponds to 100 PRBs if band of interest is full band. Thereafter, user pairing uses the metric to do successive addition of users to pairing list $S_{Prec}$ considering the users in the ordered list.

All the three embodiments, i.e. pairing unit using wideband CSI, pairing based on decimated correlation metric, and computes correlation using all CSI estimates corresponds to band of interest are performed, considering that the pairing is valid throughout the band of interest or full band. All the paired UEs may not have data to be filled in that band. So, after the user pairing is performed, the scheduler or the pairing unit 212 takes care of unequal allocation of data. That is, the pairing unit 212 uses the 2D bitmap which maps indices of PRBs in which a particular paired users' data is present Referring back to the FIG. 2, the precoder 214 determines precoding weights for each of the plurality of UE's associated with the selected group. The precoder 214 is configured with one of a linear precoding and a non-linear precoding for obtaining precoding weights for the paired UEs.

Figure 4A:
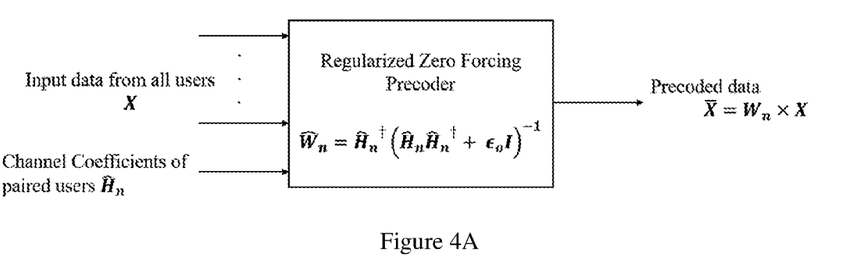
FIG. 4A shows a transceiver block diagram using a linear precoding technique, in accordance with an embodiment of the present disclosure.

In one embodiment, the precoder 214 is configured with a linear precoding technique, which is a Regularized Zero Forcing Precoder (RZFP) as shown in FIG. 4A. The RZFP weights are applied to each UE to cancel the inter layer interference.

FIG. 4A shows a transceiver block diagram using a linear precoding technique, in accordance with an embodiment of the present disclosure. Considering, $\in$ is the regularization factor. Input to Precoder is channel matrix, $$\hat{H}_n \text{ of size } N_{UEs} \times N_{tx}$$

where, $N_{UEs}$ is the number of users in $S_{Prec}$, $N_{tx}$ is the number of transmit antennas at base station, and $\hat{H}_n$ is the channel matrix formed by consolidating channel coefficients of all $N_{UEs}$ in $n^{th}$ PRB.

Precoder weights are calculated using the below equations:

$$\hat{W}_n = \hat{H}_n^\dagger t(\hat{H}_n \hat{H}_n^\dagger + \in_o I)^{-1}$$

$$\in_o = trace(\hat{H}_n \hat{H}_n^\dagger) * 10^{-6}$$

where, $W_n$ are precoding weights and $W_n$ are normalized precoding weights, and $\in_o$ is the regularization factor to make $\hat{H}_n \hat{H}_n^\dagger$ invertible.

Considering that the precoder 214 is configured with a precoding granularity as per PRB. The precoding may be performed with physical resource group (PRG) (4 PRBs) level granularity. In PRG level precoding, CSI acquisition provides channel estimate per PRG using channel estimates per PRB. The estimate is used to calculate precoding weights which will be applied on all REs in that PRG.

One embodiment of the present disclosure is precoder normalization. This is performed by two rounds of normalizations on precoder weights. First round of normalization is performed to ensure equal power allocation among users paired for MU-MIMO and another round of normalization is performed to ensure no transmit antenna is transmitting more than allowed power.

One embodiment of the present disclosure is Column Normalization. The normalizing columns provides equal power allocation among users paired for MU-MIMO. That is dividing each column of $\hat{W}_n$ by the norm of that column as shown in the equation below:

$$colNorm_j = \sqrt{\sum_{i=0}^{N_{tx}-1} |\hat{W}_n(i, j)|^2}$$

$$\tilde{W}_n(i, j) = \frac{\hat{W}_n(i, j)}{colNorm_j}, i = 0 \text{ to } N_{tx}$$

The normalization is performed for all users j=0 to $N_{UEs}$. This normalization is performed either at PRB level or once across all PRBs. The column normalization performed on the PRB level facilitates equal power allocation in every PRB and across PRBs as well. By performing column normalization once across PRBs makes sure that total power is equally allocated across PRBs though there is possibility to have unequal power allocation within PRBs.

One embodiment of the present disclosure is row normalization. The normalizing rows facilitates that no transmit antenna is transmitting more than allowed power. To perform normalization of rows, powers are added on each antenna across all PRBs, and a maximum power among all the rows is obtained and divide rows of precoding weights in each PRB with maximum row norm:

$$maxRowNorm = \sqrt{\max\begin{pmatrix} \sum_{k=0}^{No.\ of\ PRBs-1} \sum_{j=0}^{N_{tx}-1} |\hat{W}_k(0, j)|^2, \\ \sum_{k=0}^{No.\ of\ PRBs-1} \sum_{j=0}^{N_{tx}-1} |\hat{W}_k(1, j)|^2, \ldots, \\ \sum_{k=0}^{No.\ of\ PRBs-1} \sum_{j=0}^{N_{tx}-1} |\hat{W}_k(N_{UEs}-1, j)|^2 \end{pmatrix}}$$

$W_n(i,j) = \tilde{W}_n(i,j)/maxRowNorm, i=0$ to $N_{tx}$ and $j=0$ to $N_{UEs}$ and repeat this for all PRBs In one embodiment, the precoder 214 uses a Non-Linear Precoding technique. The linear precoder performs well as long as the users are well separated, that is channel coefficients are good and total power would be effectively used without significant power penalty. In case, if the number of users to be paired increases, power penalty increases which leads to dip in SINR for the paired users. With increase in number of users, a Non-Linear Precoder provides better optimization, i.e. minimizes the power penalty by successively cancelling interlayer interference and providing effective power control based on the channel characteristics. The precoder 214 which is Non-Linear does not demand orthogonal users for pairing, and performs better than linear when non-orthogonal but are reasonably well separated users are paired.

Figure 4B:
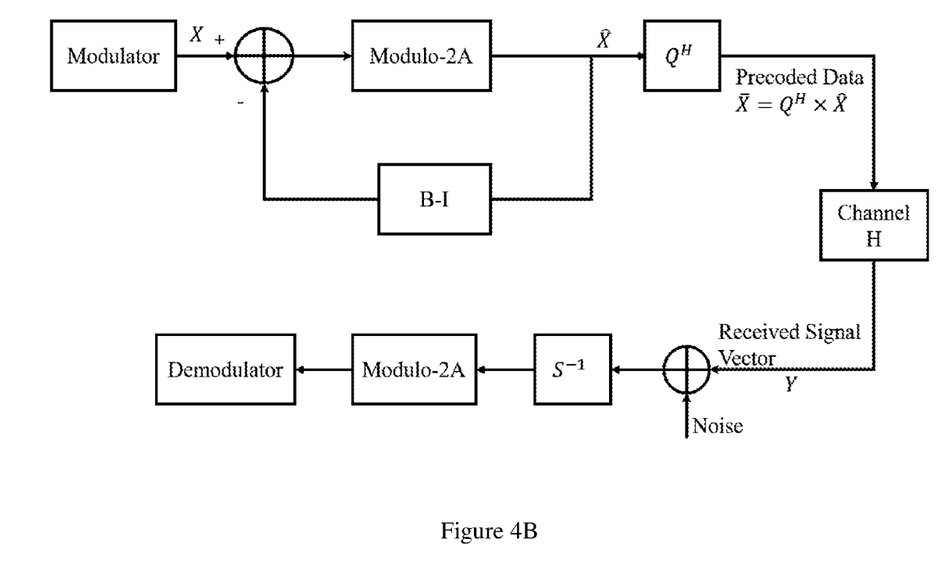
FIG. 4B shows a transceiver block diagram with a non-linear precoding technique, Tomlinson-Harashima Precoding (THP), in accordance with an embodiment of the present disclosure.

For example, considering that the channel matrix is ill-conditioned, that is, when channel coefficients of two or more users are linearly dependent, which affects all users paired for Linear precoder, only users causing ill-conditioning would be affected. FIG. 4B shows a transceiver block diagram with a non-linear precoding technique called as Tomlinson-Harashima Precoding (THP). The THP uses CSI at base station to do successive interference cancellation (SIC) across input layers.

Considering, X is modulated input symbols. CSI at base station is decomposed using LQ decomposition using the below equations:

$$H = LQ$$

$$B = S^{-1}L$$

where S is a diagonal matrix with diagonal values of L as its entries. A modulo operation is performed to keep input symbols within power limits after doing SIC.

One embodiment of the present disclosure is a precoder normalization. The Non-linear precoder is configured to perform power control among paired users. So, there is no need to perform column normalization to ensure equal power allocation which erases the essence of Non-Linear precoding. Hence, a row normalization is performed to ensure per PA transmission power in within allowable limits.

The BS 200 also comprises a plurality of antennas or transceivers (not shown in FIG. 2) for transmitting and receiving signal, i.e. at least one of data, control signals, reference signals and the like. The plurality of antennas transmit data and reference signals are associated with each of the plurality of UE's associated with the selected group, using the corresponding precoding weights on a sub-set of pool of resources, said sub-set of resources are allocated to a sub-set of plurality of groups based on the first metric.

Figure 5:
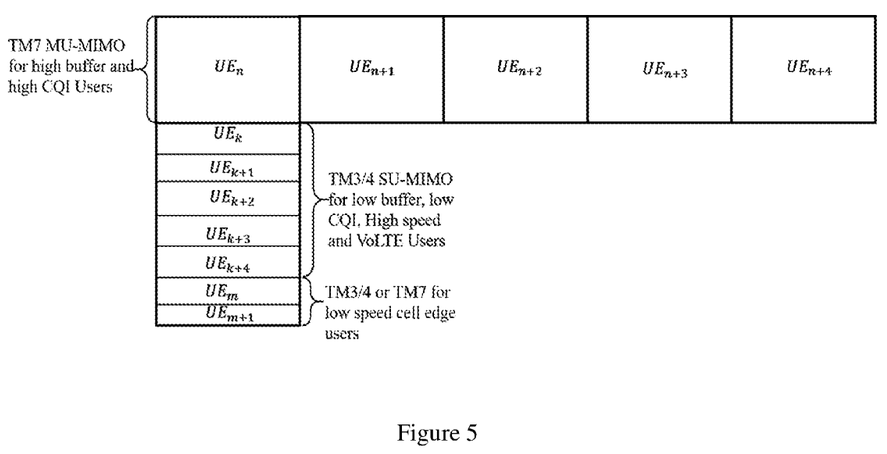
FIG. 5 shows an example illustration of resource allocation to a plurality of UEs by the communication system, in accordance with an embodiment of the present disclosure.

FIG. 5 shows an example illustration of resource allocation to a plurality of UEs by the communication system, in accordance with an embodiment of the present disclosure. As shown in FIG. 5, each column is a resource grid in which physical resource blocks (PRBs) are distributed to users from all classified groups based on the corresponding PF metric. The users from all classified groups are multiplexed in frequency in a resource grid. $\{UE_n, UE_{n+1}, UE_{n+2}, UE_{n+3}, UE_{n+4}\}$ are high buffer and high CQI users scheduled in TM7 MU-MIMO i.e., users are spatially multiplexed on same time frequency resources. $\{UE_k, UE_{k+1}, UE_{k+2}, UE_{k+3}, UE_{k+4}\}$ are one of low buffer, low CQI, high speed and VoLTE users scheduled in TM3/4 SU-MIMO and the resources are shared across frequency. Similarly, $\{UE_m, UE_{m+1}\}$ are low speed cell edge users are operated in either TM3/4 SU-MIMO or TM7 Single Layer Beamforming and resources shared across frequency.

Figure 6:
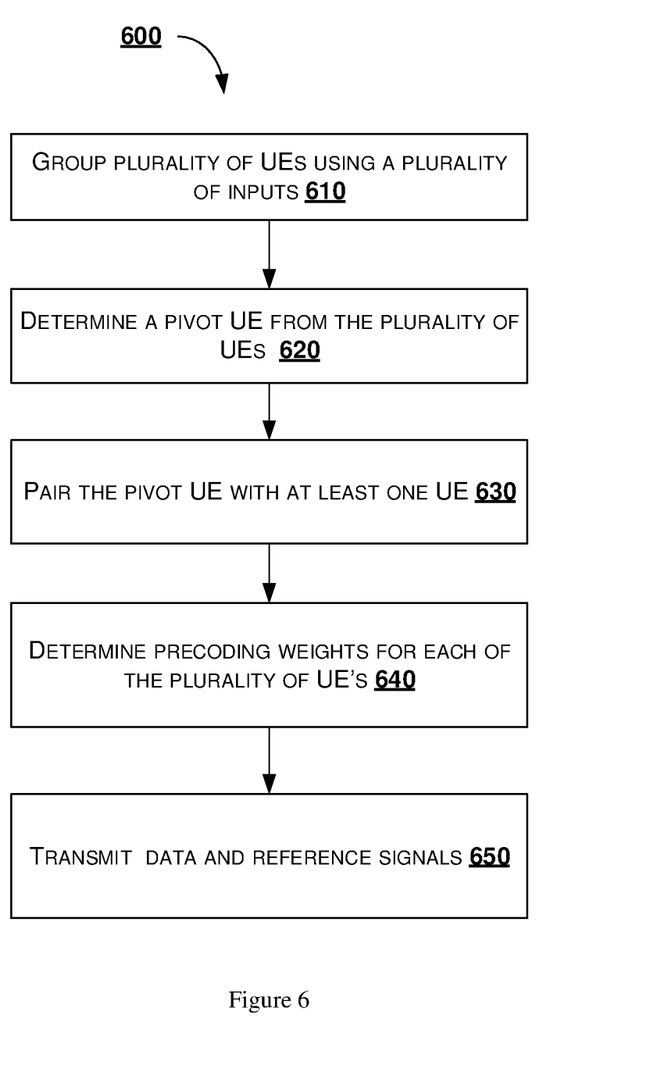
FIG. 6 shows a flowchart illustrating a method of scheduling a pool of resources to a plurality of user equipment's (UEs), in accordance with an embodiment of the present disclosure.

FIG. 6 shows a flowchart illustrating a method scheduling a pool of resources to a plurality of user equipment's (UEs), in accordance with another embodiment of the present disclosure.

As illustrated in FIG. 6, the method 600 comprises one or more blocks for method of scheduling a pool of resources to a plurality of user equipment's (UEs). The order in which the method 600 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 610, grouping the plurality of UEs is performed by a grouping unit 210, configure in the communication system 200, using a plurality of inputs to obtain a plurality of groups. The plurality of inputs is received from the plurality of UEs. The inputs are at least one of channel state information (CSI), channel quality indicator (CQI), buffer occupancy, type of traffic, and the like.

At block 620, determining a pivot UE from the plurality of UEs using a first metric associated with each of the plurality of UE's is performed by a pairing unit 212 configured in the communication system 200. The plurality of UEs are associated with a selected group from the plurality of groups. The first metric is one of proportional fair (PF) metric, number of scheduling opportunities and the like. The pivot UE is obtained from the plurality of UEs by determining a proportional fair (PF) metric for each of the plurality of UEs and selecting a UE with highest PF metric as a pivot UE.

At block 630, pairing the pivot UE with at least one UE using a second metric. The at least one UE associated with the selected group. The second metric is derived from channel state information (CSI) associated with each UE of the selected group. The pairing of the pivot UE with one or more UE's is performed by ordering the one or more UEs based on the first metric value, initializing a list with the pivot UE and performing pairing by appending a sub-set of ordered UEs to the list. The CSI any two UEs in the list are separable based on the second metric.

At block 640, determining precoding weights by the precoder 214, configured in the communication system 200, for each of the plurality of UE's associated with the selected group.

At block 650, transmitting data and reference signals associated with each of the plurality of UE's associated with the selected group, by a plurality of antennas (not shown in figures) configured in the communication system 200, using the corresponding precoding weights on a sub-set of pool of resources. The sub-set of resources are allocated to a sub-set of plurality of groups based on the first metric.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of scheduling a pool of resources to a plurality of user equipment's (UE's), the method comprising:
    grouping, by a communication system, the plurality of UE's according to a plurality
        of inputs to obtain a plurality of groups, wherein:
            the plurality of inputs are received from the plurality of UE's, and
            the plurality of groups of UE's are differentiated according to at least one of channel state information (CSI), a channel quality indicator (CQI), a buffer occupancy and a type of traffic;
    determining, by the communication system, a pivot UE in a selected group of UE's, wherein:
        a first metric differentiates the pivot UE from the other UE's in the selected group of UE's, and
        a first metric of the pivot UE has a highest value of all first metrics of the selected group of UE's;
    pairing, by the communication system, the pivot UE with at least one UE in the selected group of UE's, wherein:
        the pivot UE is paired with at least one UE according to a second metric, and a second metric of the pivot UE has a highest correlation with a second metric of the at least one UE;
determining, by the communication system, precoding weights for each of the plurality of UE's in the selected group, wherein:
the precoding weights result in an equal power allocation among UE's, and
the equal power allocation is less than or equal to an allowable power limit; and
transmitting, by the communication system, data and reference signals from the BS to each of the UE's in the selected group, wherein:
the data and the reference signals are transmitted via sub-carriers,
sub-carriers for a paired plurality of UE's are selected according to corresponding CSI's of the plurality of UE's,
the corresponding precoding weights are applied to the selected sub-carriers at selected times, and
the selected sub-carriers and the selected times correspond to a sub-set of resources that are allocated to one or more of the plurality of groups of UE's according to the first metric.

2. The method as claimed in claim 1, wherein the inputs comprise at least one of the channel state information (CSI), the channel quality indicator (CQI), the buffer occupancy and the type of traffic.

3. The method as claimed in claim 1, wherein the method comprises scheduling one or more groups of UE's using a predefined transmission mode (TM) and using one or more predefined characteristics associated with each of the plurality of groups of UE's.

4. The method as claimed in claim 3, wherein the predefined characteristics associated with each of the plurality of UE's is at least one of a high speed user, a low channel quality indicator (CQI), a low buffer user, a single user multiple input multiple output (SU-MIMO) eligible user, a multi user multiple input multiple output (MU-MIMO) eligible user, a high buffer user, a high CQI user, a cell edge user and a voice over long term evolution (LTE) user.

5. The method as claimed in claim 1, wherein the first metric is one of a proportional fair (PF) metric and a number of scheduling opportunities.

6. The method as claimed in claim 1, wherein determining a pivot UE from the plurality of UE's comprising determining a proportional fair (PF) metric for each of the plurality of UE's and selecting a UE with a highest PF metric as a pivot UE.

7. The method as claimed in claim 1, wherein the second metric is derived from channel state information (CSI) associated with each UE of the selected group.

8. The method as claimed in claim 1, wherein pairing the pivot UE with one or more UE's comprising:
ordering the one or more UE's based on the first metric value;
initializing a list with the pivot UE; and
performing pairing by appending a sub-set of ordered UE's to the list, wherein channel state information (CSI) of any two UE's in the list are separable based on the second metric.

9. The method as claimed in claim 1, wherein the transmitted data and reference signals of the paired UE's are precoded using multi-user multiple input multiple output (MU-MIMO) precoding.

10. The method as claimed in claim 1, wherein the precoding weights for the paired UE's are obtained using one of a linear precoding and a non-linear precoding.

11. The method as claimed in claim 10, wherein the obtained precoding weights are normalized to facilitate at least one of an equal power allocation for the paired UE's and a restriction of a total transmission power within an allowable limit.

12. A communication system configured to schedule a pool of resources for a plurality of user equipment's (UE's), the communication system comprising:
a base station (BS) comprising:
a memory;
a processor;
a grouping unit configured to group the plurality of UE's according to a plurality of inputs, to obtain a plurality of groups of UE's, wherein:
the plurality of inputs are received from the plurality of UE's, and
the plurality of groups of UE's are differentiated according to at least one of channel state information (CSI), a channel quality indicator (CQI), a buffer occupancy and a type of traffic;
a pairing unit configured to determine a pivot UE in a selected group of UE's, wherein:
a first metric differentiates the pivot UE from the other UE's in the selected group of UE's,
a first metric of the pivot UE has a highest value of all first metrics of the selected group of UE's,
the pairing unit is configured to pair the pivot UE, in the selected group of UE's, with at least one other UE, in the selected group of UE's, according to a second metric, and
a second metric of the pivot UE has a highest correlation with a second metric of the at least one UE;
a precoder configured to determine precoding weights for each of the UE's in the selected group, wherein:
the precoding weights result in an equal power allocation among UE's, and
the equal power allocation is less than or equal to an allowable power limit; and
a plurality of transmitters configured to transmit data and reference signals from the BS to each of the UE's in the selected group, wherein:
the data and the reference signals are transmitted via sub-carriers,
sub-carriers for a paired plurality of UE's are selected according to corresponding CSI's of the plurality of UE's,
the corresponding precoding weights are applied to the selected sub-carriers at selected times, and
the selected sub-carriers and the selected times correspond to a sub-set of resources that are allocated to one or more of the plurality of groups of UE's according to the first metric.

13. The system as claimed in claim 12, wherein the inputs comprise at least one of the channel state information (CSI), the channel quality indicator (CQI), the buffer occupancy and the type of traffic.

14. The system as claimed in claim 12, wherein the first metric is one of a proportional fair (PF) metric and a number of scheduling opportunities.

15. The system as claimed in claim 12, wherein the second metric is derived from channel state information (CSI) associated with each UE of the selected group.

16. The system as claimed in claim 12, wherein the pairing unit is configured for ordering the one more UE's based on the first metric value, initializing a list with the pivot UE, and appending a sub-set of ordered UE's to the list for pairing, wherein the CSI of any two UE's in the list are separable based on the second metric.

17. The system as claimed in claim 12, wherein the precoder configured to precode the transmitted data and reference signals of the paired UE's using multi-user multiple input multiple output (MU-MIMO) precoding weights, said precoding weights for the paired UE's are obtained using one of a linear precoding and a non-linear precoding.

18. The system as claimed in claim 17, wherein the precoder normalizes the obtained precoding weights to facilitate at least one of an equal power allocation for the paired UE's and a restriction of a total transmission power within an allowable limit.

\* \* \* \* \*